US012673742B2

(12) United States Patent
Ziraldo et al.

(10) Patent No.: US 12,673,742 B2
(45) Date of Patent: Jul. 7, 2026

(54) SEAT POST RELEASE AND HANDLEBAR HOLDING MECHANISM FOR PERSONAL TRANSPORT DEVICE

(71) Applicants: Honda Motor Co., Ltd., Tokyo (JP); JD Components Co., Ltd., Taichung City (TW)

(72) Inventors: Nicholas P. Ziraldo, Powell, OH (US); Matthew B. Staal, Torrance, CA (US); Ming Hsein Lee, Taichung (TW); Ding Jong Chou, Taichung (TW); Sheng Yu Huang, Taichung (TW)

(73) Assignee: Honda Motor Co., Ltd., Tokyo (JP)

( * ) Notice: Subject to any disclaimer, the term of this patent is extended or adjusted under 35 U.S.C. 154(b) by 650 days.

(21) Appl. No.: 18/187,408

(22) Filed: Mar. 21, 2023

(65) Prior Publication Data

US 2024/0317352 A1 Sep. 26, 2024

(51) Int. Cl.
| | |
|---|---|
| *B62K 19/36* | (2006.01) |
| *B62K 15/00* | (2006.01) |
| *B62K 21/26* | (2006.01) |

(52) U.S. Cl.
CPC .............. *B62K 19/36* (2013.01); *B62K 15/00* (2013.01); *B62K 21/26* (2013.01)

(58) Field of Classification Search
CPC ......... B62K 19/36; B62K 15/00; B62K 21/26
USPC ...................................................... 280/288.4
See application file for complete search history.

(56) References Cited

U.S. PATENT DOCUMENTS

| | | | | |
|---|---|---|---|---|
| 8,469,381 | B2 | 6/2013 | Dodman et al. | |
| 9,676,443 | B2 | 6/2017 | Perkins et al. | |
| 9,796,443 | B2 | 10/2017 | Eckert | |
| 10,717,492 | B1 | 7/2020 | Wu et al. | |
| 2003/0155738 | A1* | 8/2003 | Chen .................... | B62K 15/006 |
| | | | | 280/278 |
| 2011/0187166 | A1* | 8/2011 | Walsh ........................ | B62J 1/08 |
| | | | | 297/215.13 |
| 2016/0288857 | A1* | 10/2016 | Boutakis .............. | B62K 15/008 |
| 2016/0355225 | A1* | 12/2016 | Shirai ........................ | B62J 1/06 |

(Continued)

FOREIGN PATENT DOCUMENTS

| | | | |
|---|---|---|---|
| CN | 2516434 Y | | 10/2002 |
| CN | 205499202 U | * | 8/2016 |
| CN | 207657963 U | | 7/2018 |

(Continued)

*Primary Examiner* — Valentin Neacsu
*Assistant Examiner* — Mohamed M Medani
(74) *Attorney, Agent, or Firm* — Plumsea Law Group, LLC

(57) ABSTRACT

A compact personal transport device convertible between a riding configuration and a stowed configuration is described. In one embodiment, a seat post release and handlebar holding mechanism for the personal transport device includes a frame post attached internally and a seat post including an opening on one side that fits onto the frame post. The seat post release and handlebar holding mechanism also includes a latch connected inside the frame post to a pivot point. The latch extends outwards from one side of the frame post and extends through the opening in the seat post in a secured position. The seat post release and handlebar holding mechanism also includes a lever member attached to the latch at a first end and having an engaging surface at an opposite second end extending out from the frame post on an opposite side from the latch.

20 Claims, 10 Drawing Sheets

(56) References Cited

U.S. PATENT DOCUMENTS

2022/0185418 A1 * 6/2022 Christ ........................ B62J 1/08

FOREIGN PATENT DOCUMENTS

| CN | 109436074 | A |   | 3/2019 | |
|----|-----------|---|---|--------|---|
| CN | 209617366 | U |   | 11/2019 | |
| CN | 214875342 | U |   | 11/2021 | |
| GB | 2530392 | A | * | 3/2016 | .............. B62H 5/20 |
| IN | 202011013034 | A |   | 10/2021 | |

* cited by examiner

SEAT POST RELEASE AND HANDLEBAR HOLDING MECHANISM FOR PERSONAL TRANSPORT DEVICE

BACKGROUND

This disclosure relates generally to vehicles, and in particular to a seat post release and handlebar holding mechanism for a compact personal transport device that is convertible between a stowed configuration and a riding configuration.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network. One existing barrier to widespread use of compact personal transport devices is the time needed to set up and collapse the devices before and after their use.

Accordingly, there is a need in the art for an improved compact personal transport device that can be set up and collapsed quickly.

SUMMARY

In one aspect, a seat post release and handlebar holding mechanism for a personal transport device is provided. The seat post release and handlebar holding mechanism includes a frame post attached internally to the personal transport device and a seat post including an opening on one side. The seat post is configured to fit onto the frame post. The seat post release and handlebar holding mechanism further including a latch connected inside of the frame post to a pivot point. The latch extending outwards from one side of the frame post and extending through the opening in the seat post in a secured position. The seat post release and handlebar holding mechanism also including a lever member attached to the latch at a first end and having an engaging surface at an opposite second end. The engaging surface of the lever member extending out from the frame post on an opposite side from the latch.

In another aspect, a seat assembly for a personal transport device is provided. The seat assembly includes a seat having a seat surface and a seat post attached to an underside of the seat. The seat post including an opening on one side. The seat post is configured to removably attach to a frame post of the personal transport device. The seat assembly also includes a seat post release and handlebar holding mechanism having a latch connected inside the frame post at a pivot point and a lever member attached to the latch at a first end and having an engaging surface at an opposite second end that extends outwards out from the frame post on an opposite side from the latch. The latch extends through the opening in the seat post when the seat post is attached to the frame post and the latch is in a secured position to mechanically lock the seat post to the frame post.

In another aspect, a compact personal transport device is provided. The compact personal transport device includes an outer casing extending between a top edge and a bottom edge in a vertical direction and extending between a front edge and a rear edge in a horizontal direction. An opening is disposed along a top surface of the outer casing. The compact personal transport device also includes a frame post attached internally inside the outer casing, the frame post extending in the vertical direction. The compact personal transport device also includes a seat assembly configured to be removably mounted on the frame post of the compact personal transport device through the opening. The seat assembly includes a seat having a seat surface and a seat post attached to an underside of the seat. The seat post including an opening on one side. The seat post is configured to removably attach to the frame post of the compact personal transport device. The seat assembly further includes a seat post release and handlebar holding mechanism having a latch connected inside the frame post at a pivot point and a lever member attached to the latch at a first end and having an engaging surface at an opposite second end that extends outwards out from the frame post on an opposite side from the latch. The latch extends through the opening in the seat post when the seat post is attached to the frame post and the latch is in a secured position to mechanically lock the seat post to the frame post.

Other systems, methods, features and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments of a compact personal transport device with a seat post release and handlebar holding mechanism that assists with securing components of the personal transport device in a riding configuration and a stowed configuration are described herein. The techniques described in connection with the present embodiments may be used to provide a personal transport device having a seat post release and handlebar holding mechanism that functions to secure the seat post in a riding configuration and also functions to secure the folded handlebar in place in a stowed configuration. In the stowed configuration, the personal transport device has a compact form factor with a handle that allows a user to carry it in a primary vehicle, on public transportation, and/or on other forms of transportation to be used for "last-mile" or "first-mile" trips to and from a destination.

The example embodiments are described herein with reference to a personal transport device in the form of an electric scooter. As used herein, an electric scooter is a term used mainly to describe a scooter that is electrically powered. For example, this is a type of personal transport device that is gaining ridership in many locations. The principles of the example embodiments described herein may be applied to electric scooters or other types of personal transport devices, such as bicycles, unicycles, mopeds, skateboards, kickboards, wheelchairs, personal transporters, or the like.

In the example embodiments described herein, the electric scooter has an outer casing having a generally rectangular shape, including two flat sides having a length that is longer than a height. In addition, the electric scooter of the present embodiments has a width that is substantially smaller than the length and/or height of the electric scooter. In the example embodiments, the electric scooter may be transitioned between a riding configuration in which components of the electric scooter are in extended positions outside of the rectangular outer casing so that the electric scooter may be operated or ridden by a user to a stowed configuration in which components of the electric scooter are folded or stored inside the outer casing.

Figure 1:
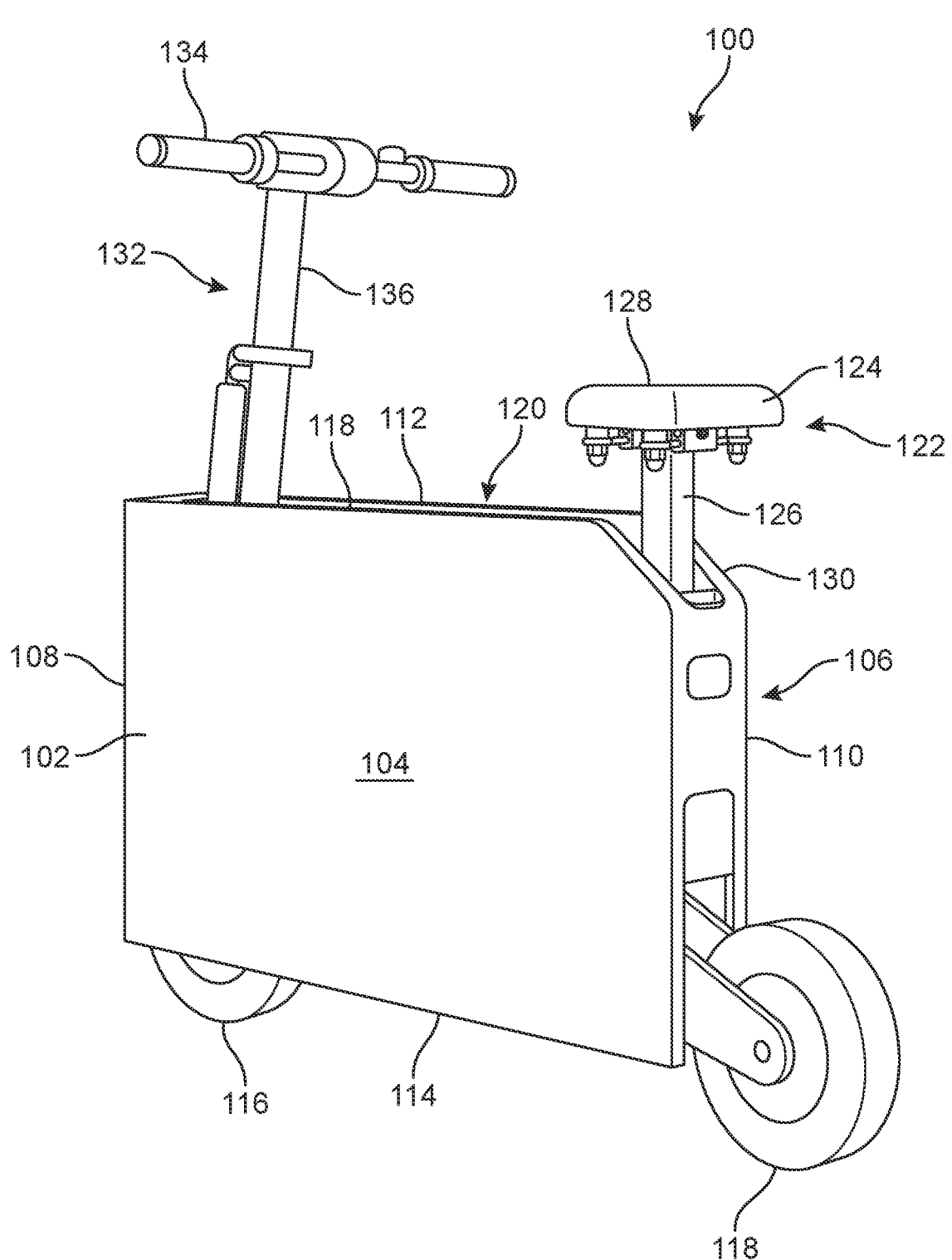
FIG. 1 is an isometric view of an example embodiment of a compact personal transport device in the form of an electric scooter in a riding configuration in accordance with aspects of the present disclosure.

Referring now to FIG. 1, an example embodiment of a personal transport device 100 (e.g., in the form of an electric scooter 100) is shown. In some embodiments, electric scooter 100 may be quickly transitioned or converted between a riding configuration in which components of electric scooter 100 are in extended positions outside of an outer casing 102 so that electric scooter 100 may be operated or ridden by a user to a stowed configuration in which components of electric scooter 100 are folded or collapsed to stored positions inside outer casing 102. As shown in FIG. 1, electric scooter 100 is in the riding configuration (FIG. 9, described in detail below, shows electric scooter 100 in the stowed configuration).

In an example embodiment, outer casing 102 of electric scooter 100 includes a first side surface 104 and an opposite second side surface 106. Outer casing 102 has a width between the first side surface 104 and the opposite second side surface 106 that defines a thickness of electric scooter 100. In an example embodiment, side surfaces of outer casing 102 are substantially flat, including each of first side surface 104 and the opposite second side surface 106. Outer casing 102 of electric scooter 100 extends between a front edge 108 and an opposite rear edge 110, as well as a top edge 112 and an opposite bottom edge 114. Front edge 108, rear edge 110, top edge 112, and bottom edge 114 are substantially straight and define an outer perimeter of rectangular-shaped outer casing 102 of electric scooter 100.

In this embodiment, a front wheel 116 is visible along bottom edge 114 of electric scooter 100 near front edge 108. Electric scooter 100 also includes a rear wheel 118 that is shown extended outside of outer casing 102 (i.e., in the riding configuration as shown in FIG. 1) along bottom edge 114 near rear edge 110. Rear wheel 118 is configured to slide or retract inside of outer casing 102 in the stowed configuration.

Electric scooter 100 includes a top surface disposed between first side surface 104 and the opposite second side surface 106. In an example embodiment, the top surface includes an opening 120 extending substantially along the length of electric scooter 100 (i.e., from front edge 108 to rear edge 110). In one embodiment, opening 120 is disposed spaced from front edge 108 of electric scooter 100 and extends all the way to rear edge 110. In some embodiments, opening 120 extends to rear edge 110 along the top surface 118 partially extends down rear edge 110. In this embodiment, opening 120 is in the form of a slot disposed between first side surface 104 and the opposite second side surface 106.

In some embodiments, electric scooter 100 includes components configured to allow a user to ride electric scooter 100 in the riding configuration. For example, in this embodiment, electric scooter 100 includes a seat assembly 122 and a steering assembly 132. In one embodiment, seat assembly 122 includes a seat 124 attached on top of a seat post 126 that is configured to mount to a corresponding frame post that is attached internally to the inside of electric scooter 100 (e.g., inside outer casing 102). In an example embodiment, seat assembly 122 is configured to be removably attached to electric scooter 100. Seat 124 includes a seat surface 128 having a substantially horizontal orientation that is perpendicular to seat post 126 so that a user may comfortably sit on seat 124 of seat assembly 122 while riding electric scooter 100 in the riding configuration.

In an example embodiment, seat assembly 122 is disposed at the rear of electric scooter 100 at or adjacent to rear edge 110. In some embodiments, the outer perimeter of rectangular-shaped outer casing 102 of electric scooter 100 may include a sloped edge 130 that extends between top edge 112 and rear edge 110 at a downwardly sloped angle. For example, in some cases, the angle of sloped edge 130 may be in a range between 20 degrees and 45 degrees. Seat assembly 122 is disposed directly above sloped edge 130 and provides additional space or room underneath seat assembly 122 compared to a squared edge at the intersection of top edge 112 and rear edge 110. By providing sloped edge 130 under seat assembly 122, a user of electric scooter 100 can easily access and manipulate a seat post release and handlebar holding mechanism associated with seat assembly 122 to remove seat assembly 122 from electric scooter 100. With this arrangement, electric scooter 100 may be quickly and conveniently transitioned between a riding configuration and a stowed configuration.

In some embodiments, steering assembly 132 is configured to control orientation of front wheel 116 to allow a user to steer electric scooter 100 in the riding configuration. In an example embodiment, steering assembly 132 includes a handlebar 134 that is configured to receive hands of a user to steer front wheel 116. In one embodiment, steering assembly 132 includes a steering shaft 136 with a fork that is attached to an axle of front wheel 116 at one end. The opposite end of the fork is attached to a lower portion of steering shaft 136 disposed inside of outer casing 102 of electric scooter 100. Handlebar 134 is located at a top end of steering shaft 136 and is connected to an upper portion of steering shaft 136. The upper portion of steering shaft 136 extends downwards towards top edge 112 of electric scooter 100 and is extended outside of outer casing 102 of electric scooter 100 through opening 120 when electric scooter 100 is in the riding configuration (as shown in FIG. 1).

As shown in FIG. 1, steering shaft 136 of electric scooter 100 extends upwards from opening 120 when electric scooter 100 is in the riding configuration and is configured to be folded downwards into opening 120 to transition electric scooter 100 to the stowed configuration, as will be described below. In this embodiment, handlebar 134 is shown in an extended position with a substantially horizontal orientation so that handlebar 134 is approximately perpendicular to steering shaft 136. Handlebar 134 and steering shaft 136 are configured to allow a user to control orientation of front wheel 116 to steer electric scooter 100 in the riding configuration.

In an example embodiment, one or more portions of steering shaft 136 may be telescopic. That is, one or more portions of steering shaft 136 may be formed of concentric tubular sections designed to slide into one another to collapse or extend steering shaft 136. For example, in one embodiment, the upper portion of steering shaft 136 may be telescopic. With this arrangement, a height of steering shaft 136 may be transitioned between a taller height in an extended position when electric scooter 100 is in the riding configuration and a shorter height in a folded position when electric scooter 100 is in the stowed configuration.

Figure 9:
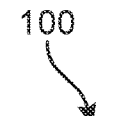
FIG. 9 is a representative view of the example embodiment of the electric scooter in the stowed configuration in accordance with aspects of the present disclosure.
Figure 9:
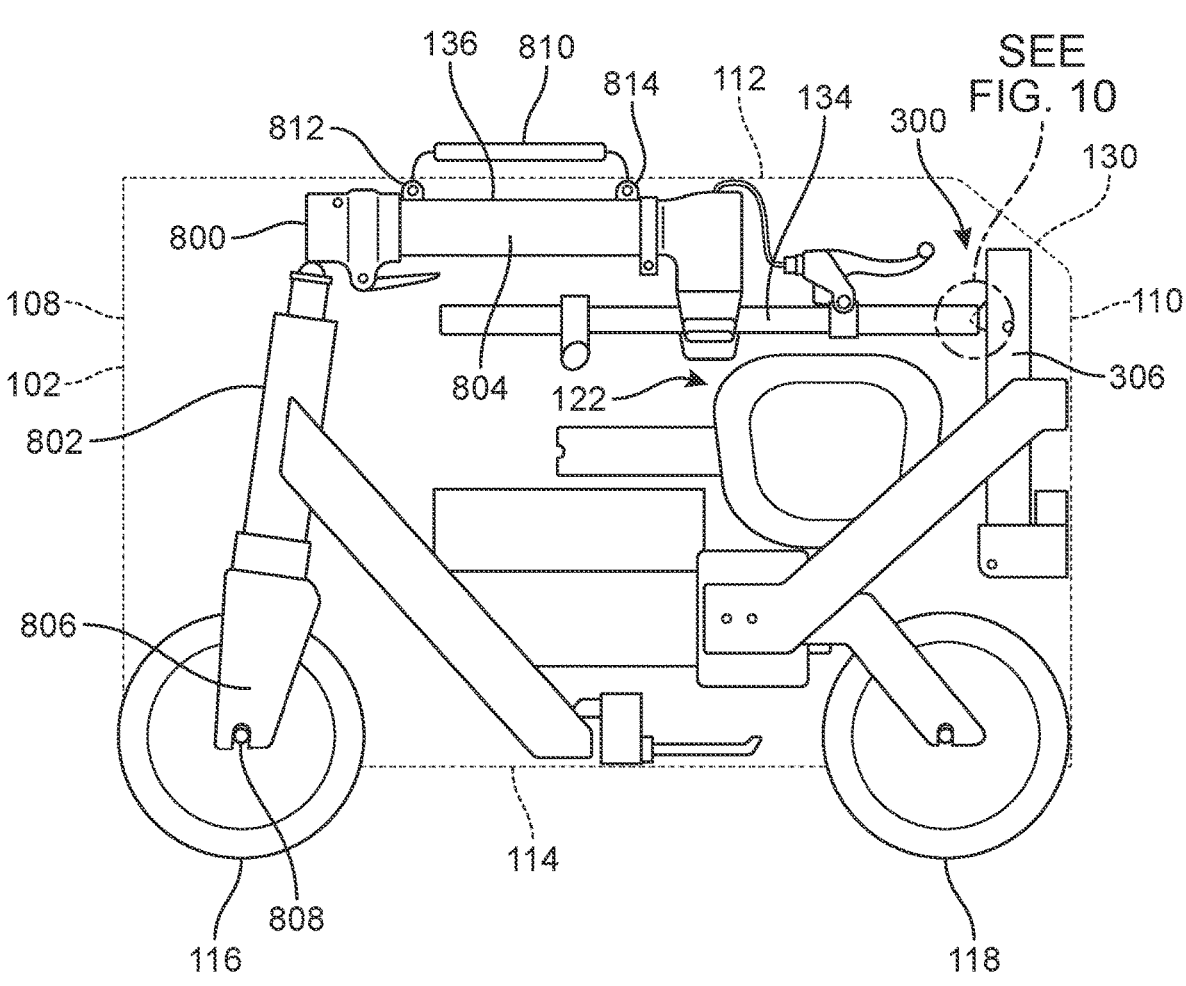

The lower portion of steering shaft 136 extends upwards from the fork inside of outer casing 102 towards top edge 112 of electric scooter 100 to a shaft connection mechanism that includes a hinge (or similar mechanism) that connects the lower portion and the upper portion of steering shaft 136. With this arrangement, steering assembly 132 may be transitioned or converted from an upright extended position when electric scooter 100 is in the riding configuration (as shown in FIG. 1) to a folded position when electric scooter 100 is in the stowed configuration (as shown in FIG. 9).

It should be understood that a personal transport device according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described herein.

Figure 2:
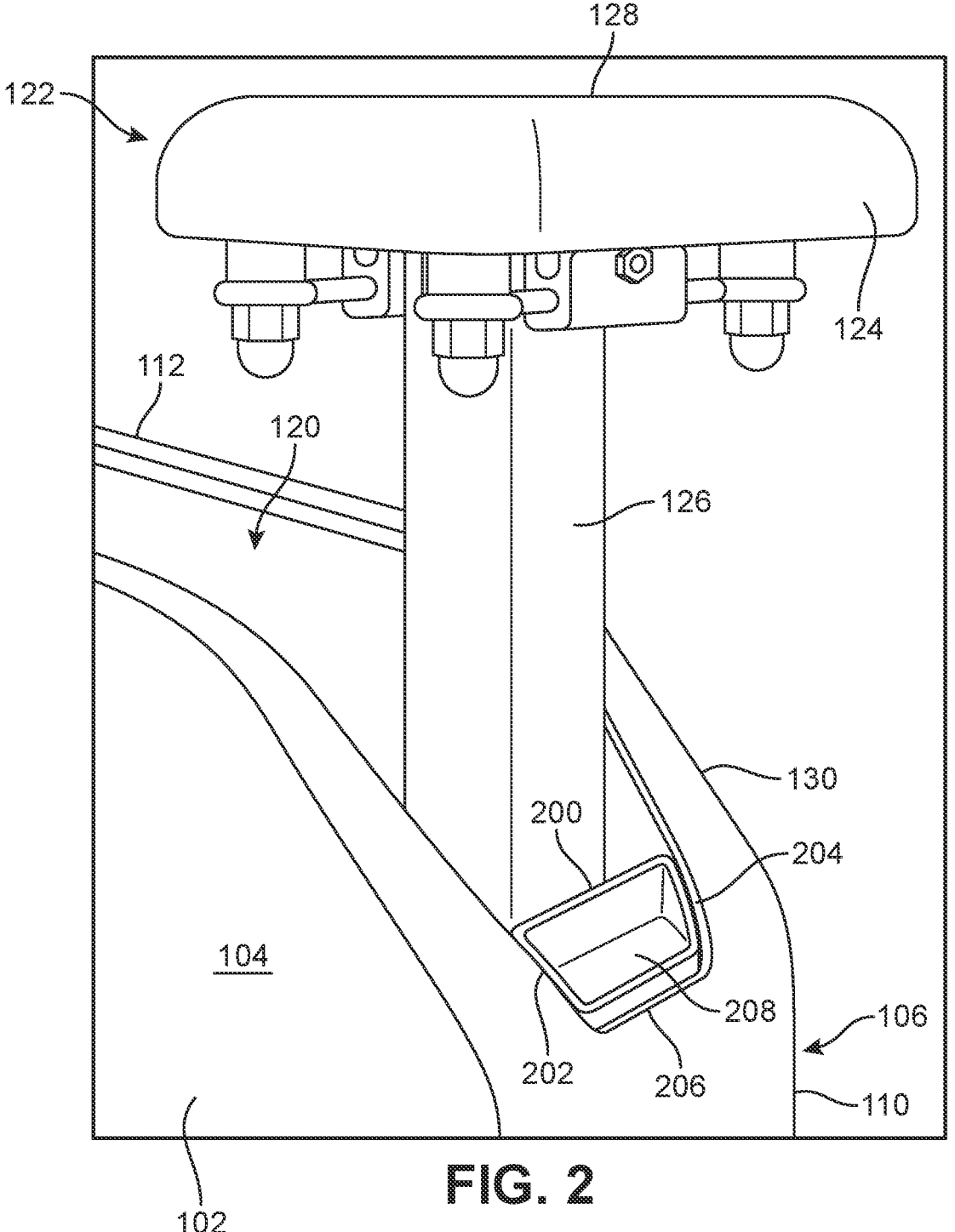
FIG. 2 is an enlarged isometric view of an example embodiment of a seat assembly for the electric scooter including a seat post release and handlebar holding mechanism in accordance with aspects of the present disclosure.

Referring now to FIG. 2, a close up of the example embodiment of seat assembly 122 at the rear of electric scooter 100 is shown. In an example embodiment, seat assembly 122 includes seat 124 having seat surface 128. Seat surface 128 is a substantially rectangular planar surface that has an approximately horizontal orientation configured to provide a platform to allow a user of electric scooter 100 to sit on seat 124 when electric scooter 100 is in the riding configuration. In some embodiments, seat 124 is attached on top of seat post 126 that is configured to mount to a corresponding frame post (e.g., frame post 306, shown in FIG. 3) that is attached internally to the inside of electric scooter 100 (e.g., inside outer casing 102).

In an example embodiment, seat assembly 122 is configured to be removably attached to electric scooter 100. As shown in FIG. 2, seat post 126 of seat assembly 122 is disposed within opening 120 between first side surface 104 and the opposite second side surface 106 so that a bottom end of seat post 126 may mate with and connect to the corresponding frame post inside outer casing 102 of electric scooter 100 (e.g. frame post 306 shown in FIG. 3 and described below).

In some embodiments, electric scooter 100 may include a seat post release and handlebar holding mechanism (shown in FIG. 3 and described below) that allows a user to quickly remove seat assembly 122 to transition electric scooter 100 from the riding configuration to the stowed configuration. In an example embodiment, the seat post release and handlebar holding mechanism may be actuated by a user of electric scooter 100 by depressing a release button 200 provided at the rear of electric scooter 100 behind seat assembly 122. As shown in FIG. 2, release button 200 is located within opening 120 between a first opening edge 202 on one side of opening 120 and a second opening edge 204 on the opposite side of opening 120. In an example embodiment, release button 200 is located between a back side of seat post 126 of seat assembly 122 and a back opening edge 206 of opening 120 that extends laterally across opening 120 from first opening edge 202 to second opening edge 204. In some embodiments, release button 200 may include a depression surface 208 that provides a substantially horizontal planar surface for a user to press on to apply a downward force to release button 200 so as to actuate the seat post release and handlebar holding mechanism, as will be further described below.

Figure 3:
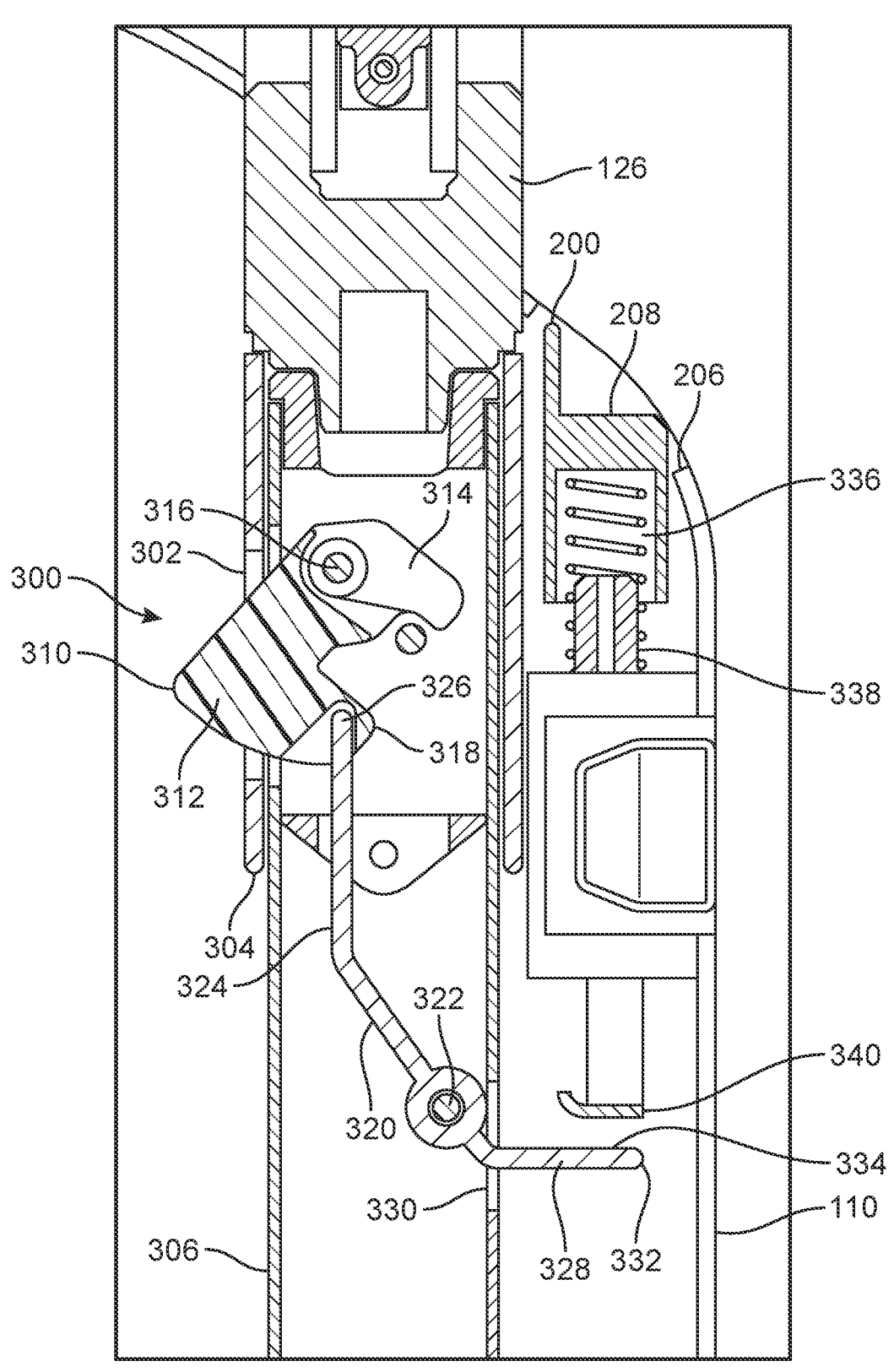
FIG. 3 is a cross section view of the example embodiment of the seat assembly including the seat post release and handlebar holding mechanism in accordance with aspects of the present disclosure.

According to the example embodiments described herein, seat assembly 122 includes a seat post release and handlebar holding mechanism 300 (also referred to herein as "release and holding mechanism 300"). Referring now to FIG. 3, a cross-section view of seat assembly 122 is shown to illustrate components of release and holding mechanism 300. In this embodiment, seat post 126 of seat assembly 122 is shown disposed on a frame post 306 that is attached internally to the inside of electric scooter 100. As shown in FIG. 3, a bottom end 304 of seat post 126 is configured to fit onto and extend over at least a portion of frame post 306. In an example embodiment, release and holding mechanism 300 is configured to secure seat post 126 on frame post 306 when electric scooter 100 is in the riding configuration. With this arrangement, a user of electric scooter 100 may sit on seat 124 of seat assembly 122 while riding electric scooter 100 in the riding configuration.

In an example embodiment, release and holding mechanism 300 includes a latch 310 disposed within an interior of frame post 306. Latch 310 of release and holding mechanism 300 is moveable between a secured position and a released position. As shown in FIG. 3, latch 310 is in the secured position with a front portion 312 that extends from the interior of frame post 306 to an exterior of frame post 306 through an opening 302 in seat post 126. Front portion 312 of latch 310 extends through opening 302 in seat post 126 to provide a mechanical interlock that prevents seat post 126 from being removed from its attachment with frame post 306 when latch 310 is in the secured position.

In an example embodiment, latch 310 has a generally triangular-shaped front portion 312 located on an opposite end of latch 310 from a rear portion 314. In some embodiments, latch 310 is attached to the interior of frame post 306 via a pivot point 316. Latch 310 is configured to rotate about pivot point 316 to transition between the secured position (shown in FIG. 3) where front portion 312 of latch 310 extends through opening 302 in seat post 126 and the released position (shown in FIG. 6) where front portion 312 of latch 310 is removed from opening 302 in seat post 126.

In some embodiments, latch 310 of release and holding mechanism 300 may be moved or transitioned between the secured position and the released position by action of a lever member 320. Lever member 320 is disposed within the interior of frame post 306 and is attached inside frame post 306 at a pivot point 322. A first portion 324 of lever member 320 extends in a first direction from pivot point 322 to latch 310. For example, as shown in FIG. 3, first portion 324 of lever member 320 extends upwards in a vertical direction from pivot point 322 to latch 310. First portion 324 of lever member 320 connects with a pivot end 318 of latch 310 at a first end 326. A second portion 328 of lever member 320 extends in a second direction from pivot point 322 through a lower opening 330 in frame post 306 on the back side facing towards rear edge 110 of electric scooter 100.

For example, as shown in FIG. 3, second portion 328 of lever member 320 extends laterally in a horizontal direction from pivot point 322 through lower opening 330 in frame post 306. In an example embodiment, second portion 328 of lever member 320 includes a second end 332 that is located outside of frame post 306 facing towards rear edge 110 of electric scooter 100. Second portion 328 of lever member 320 also includes an engaging surface 334 that extends from lower opening 330 to second end 332 of lever member 320. As will be described in more detail below, engaging surface 334 provides a generally flat planar surface that may receive a downward force applied against it to cause lever member 320 to rotate at pivot point 322 and thereby move latch 310, via the connection with first end 326 and pivot end 318 of latch 310, to transition latch 310 from the secured position to the released position.

As described above, release button 200 of release and holding mechanism 300 is disposed behind seat assembly 122 and is configured to allow a user of electric scooter 100 to actuate latch 310 from the secured position to the released position, for example, via lever member 320. In an example embodiment, release and holding mechanism 300 includes a spring 336 and a plunger 338 positioned beneath depression surface 208 of release button 200. Spring 336 is configured to apply a restoring force to plunger 338 and release button 200 that biases release button 200 into a default position until depressed by a user of electric scooter 100. In the default position, depression surface 208 of release button 200 is generally located above back opening edge 206 of opening 120 at the rear of electric scooter 100.

In an example embodiment, a bottom end of plunger 338 includes a foot 340 that is configured to contact engaging surface 334 on second portion 328 of lever member 320. As shown in FIG. 3, foot 340 of plunger 338 is positioned directly above engaging surface 334. With this arrangement, a downward force applied to plunger 338 via depression surface 208 of release button 200 moves foot 340 into contact with engaging surface 334, as will be described below in reference to FIG. 6.

Figure 4:
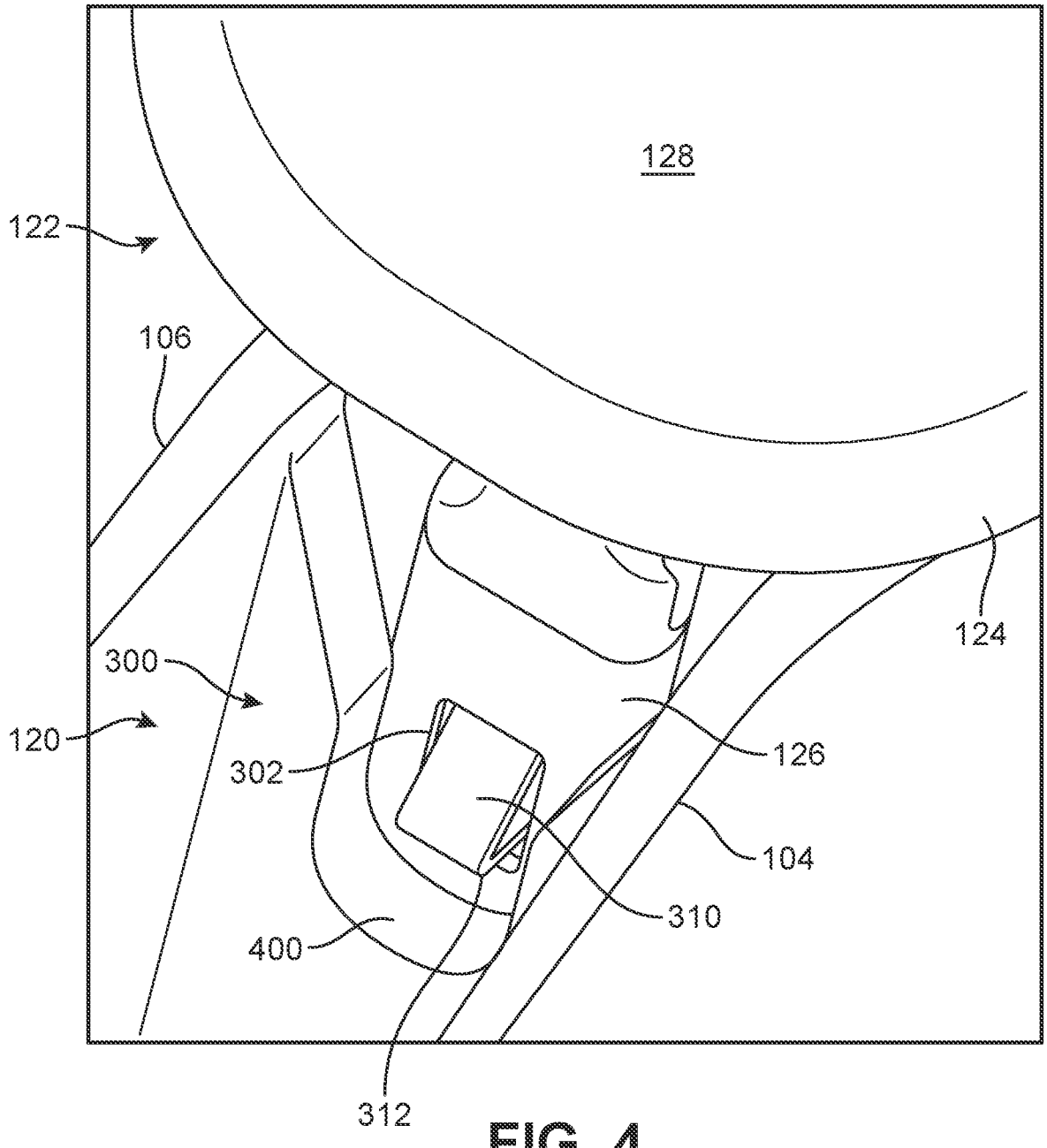
FIG. 4 is a close up view of the example embodiment of the seat assembly including the seat post release and handlebar holding mechanism in accordance with aspects of the present disclosure.

Referring now to FIG. 4, a front view of seat post release and handlebar holding mechanism 300 is shown. In this embodiment, latch 310 is shown in the secured position extending through opening 302 on the front side of seat post 126. As described above, when front portion 312 of latch 310 is extended through opening 302, seat assembly 122 is secured to frame post 306 by the mechanical interlock between latch 310 and opening 302 that prevents seat assembly 122 from being lifted up and removed.

Figure 10:
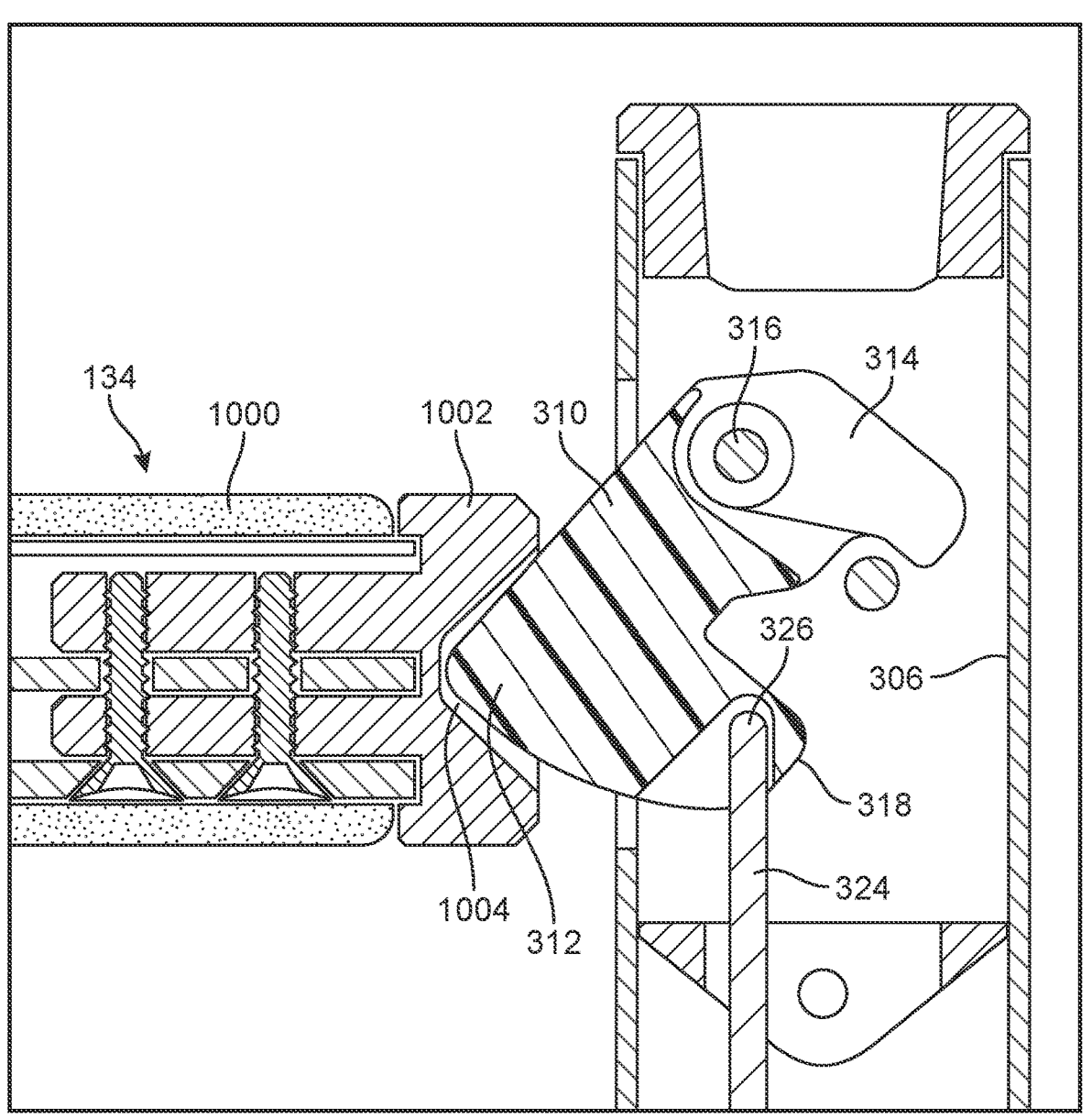
FIG. 10 is a cross section view of the seat post release and handlebar holding mechanism securing the handlebar of the electric scooter in the stowed configuration in accordance with aspects of the present disclosure.

As described above, in some embodiments, seat post release and handlebar holding mechanism 300 is also configured to hold the handlebar of the steering assembly (e.g., handlebar 134 of steering assembly 132 shown in FIG. 1) in the folded position when electric scooter 100 is transitioned to the stowed configuration. In an example embodiment, a notch 400 is disposed between first side surface 104 and opposite second side surface 106 of outer casing 102 within opening 120. Notch 400 is disposed at a location beneath front portion 312 of latch 310 of release and holding mechanism 300. Notch 400 has a generally curved concave shape configured to correspond with the rounded shape of handlebar 134. With this arrangement, when handlebar 134 is in the folded position, front portion 312 of latch 310 may engage with a corresponding indented opening in an end cap of handlebar 134 to secure handlebar 134 in the folded position within opening 120 (as shown in FIG. 10).

Figure 5:
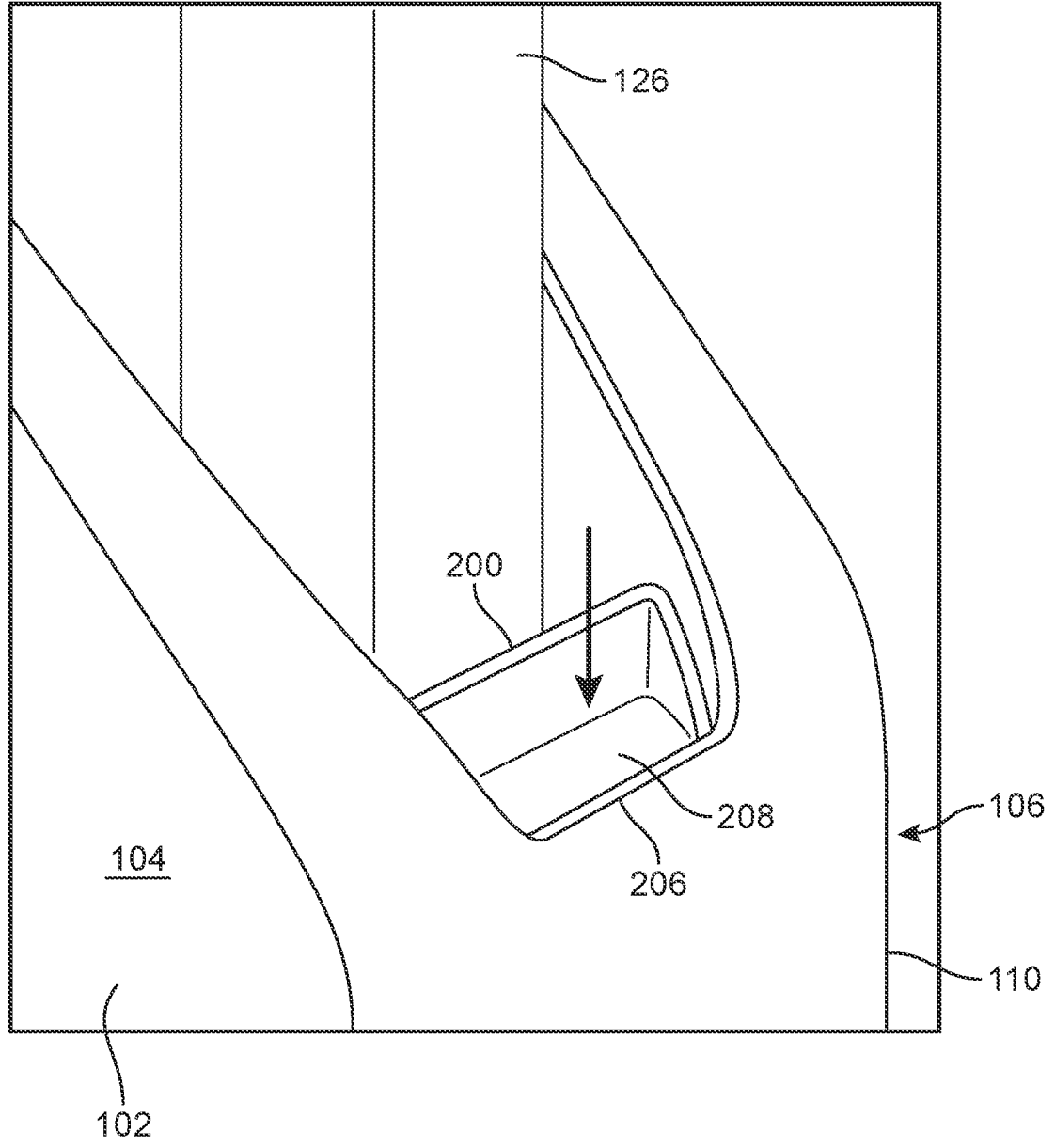
FIG. 5 is a close up view of the seat post release button being depressed to release the seat assembly from the electric scooter in accordance with aspects of the present disclosure.

Referring now to FIG. 5, a close up view of release and holding mechanism 300 being depressed to release seat assembly 122 from electric scooter 100 is shown. In an example embodiment, release button 200 may be depressed to actuate release and holding mechanism 300 to allow a user to quickly remove seat assembly 122 to transition electric scooter 100 from the riding configuration to the stowed configuration. As shown in FIG. 5, depression surface 208 of release button 200 is moved downward so that depression surface 208 is moved below back opening edge 206 of opening 120 at the rear of electric scooter 100. As will be described in more detail below, the downward force applied to depression surface 208 of release button 200 causes latch 310 of release and holding mechanism 300 to withdraw from opening 302 in seat post 126 and allows seat assembly 122 to be removed from its connection with frame post 306.

Figure 6:
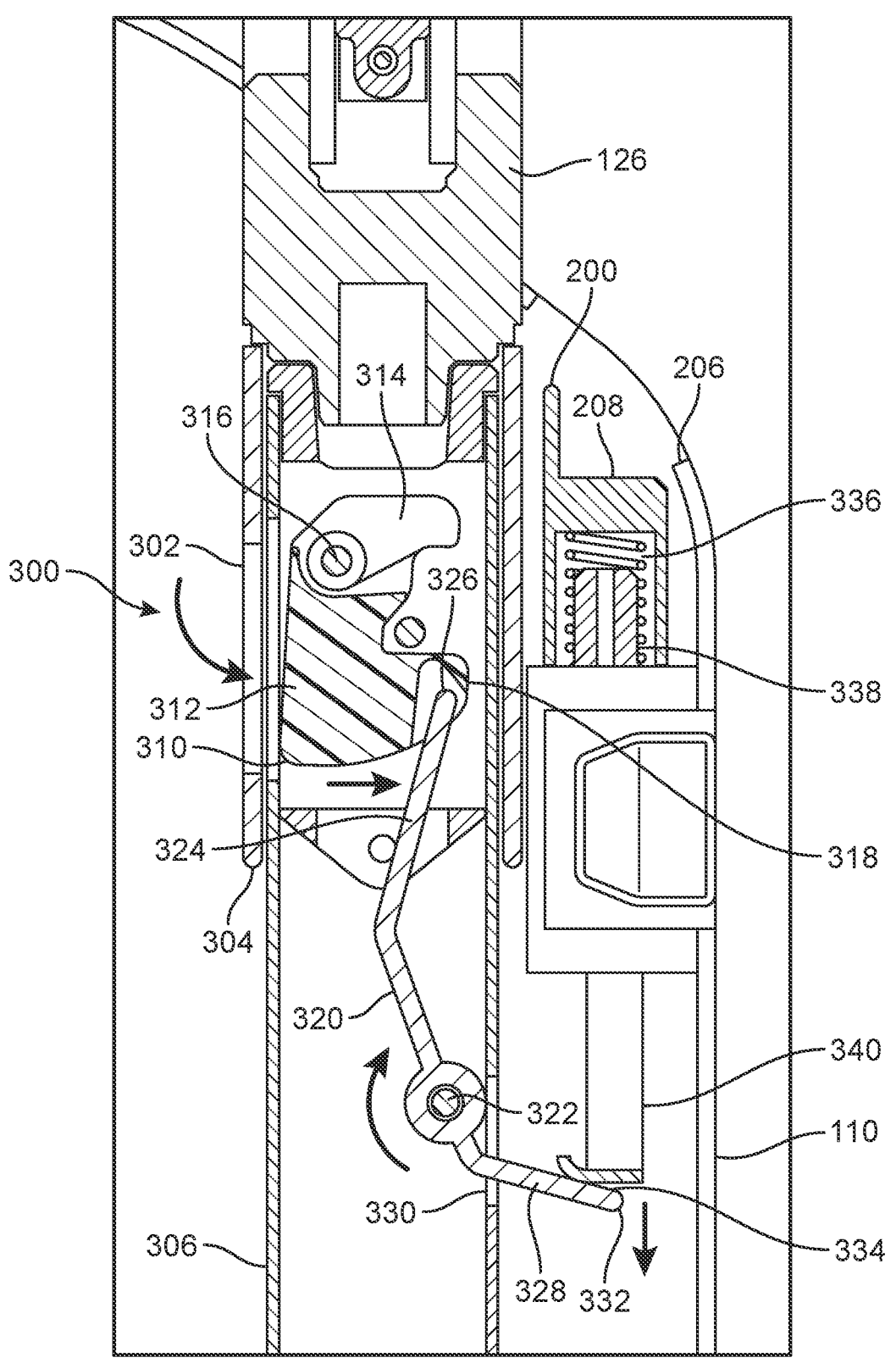
FIG. 6 is a cross section view of the example embodiment of the seat assembly including the seat post release and handlebar holding mechanism being released in accordance with aspects of the present disclosure.

FIG. 6 illustrates a cross section view of seat assembly 122 including seat post release and handlebar holding mechanism 300 being transitioned from the secured position (as shown in FIG. 3) to the released position, for example, upon application of a downward force on depression surface 208 of release button 200, as described above in reference to FIG. 5. In this embodiment, when release button 200 is pressed, the downward force on depression surface 208 of release button 200 is applied to plunger 338. This downward force on plunger 338 causes foot 340 to move into contact with engaging surface 334 at second end 332 of lever member 320. Foot 340 pushes against engaging surface 334 to move second end 332 of second portion 328 of lever member 320 downwards. This downward movement of second end 332 of second portion 328 of lever member 320 causes lever member 320 to rotate at pivot point 322 and thereby moves first end 326 of first portion 324 of lever member 320.

As shown in FIG. 6, first end 326 of lever member 320 is attached to latch 310 at pivot end 318. The rotation of lever member 320 at pivot point 322 causes first end 326 to move latch 310 inwards, which causes front portion 312 of latch 310 to withdrawn or be removed from opening 302 in seat post 126. That is, the downward force applied to one end of lever member 320 (i.e., second end 332) causes the opposite end (i.e., first end 326) of lever member 320 to move latch 310 of release mechanism 300 from the secured position to the released position (as shown here in FIG. 6).

Figure 7:
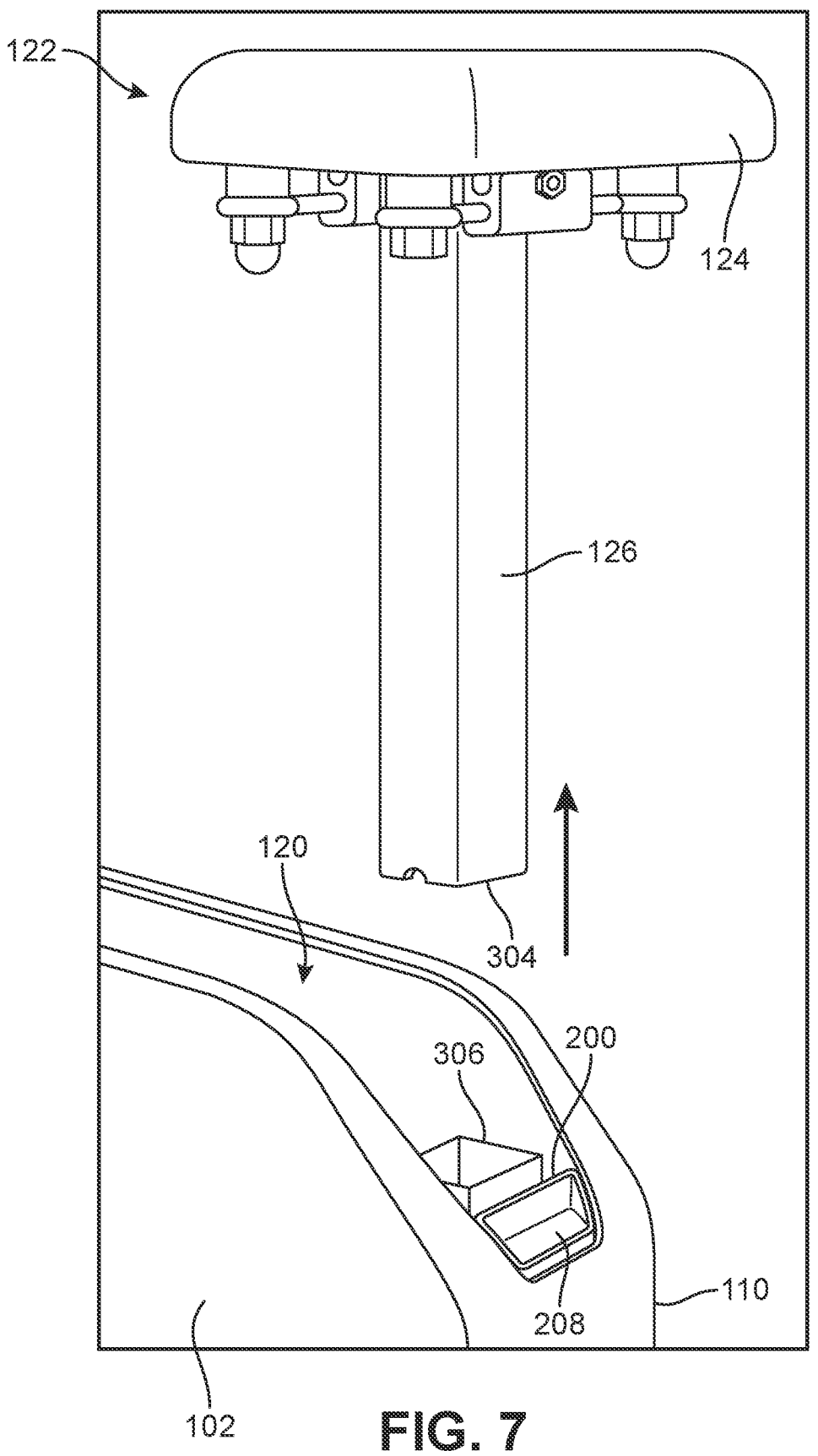
FIG. 7 is a close up view of the example embodiment of the seat assembly being removed from the electric scooter in accordance with aspects of the present disclosure.

With front portion 312 of latch 310 withdrawn or removed from opening 302 in seat post 126, seat assembly 122 may be removed from electric scooter 100 by applying an upward force on seat post 126 to disengage its attachment with frame post 306 inside outer casing 102 of electric scooter 100. For example, as shown in FIG. 7, once release and holding mechanism 300 has been actuated as described above to release latch 310 from opening 302, seat assembly 122 may be lifted upwards from within opening 120 so that seat post 126 is disengaged from frame post 306. In some embodiments, after seat assembly 122 has been removed, seat 124 may be folded to one side of seat assembly 122 for easy storage within an internal storage compartment inside outer casing 102 of electric scooter 100.

Figure 8:
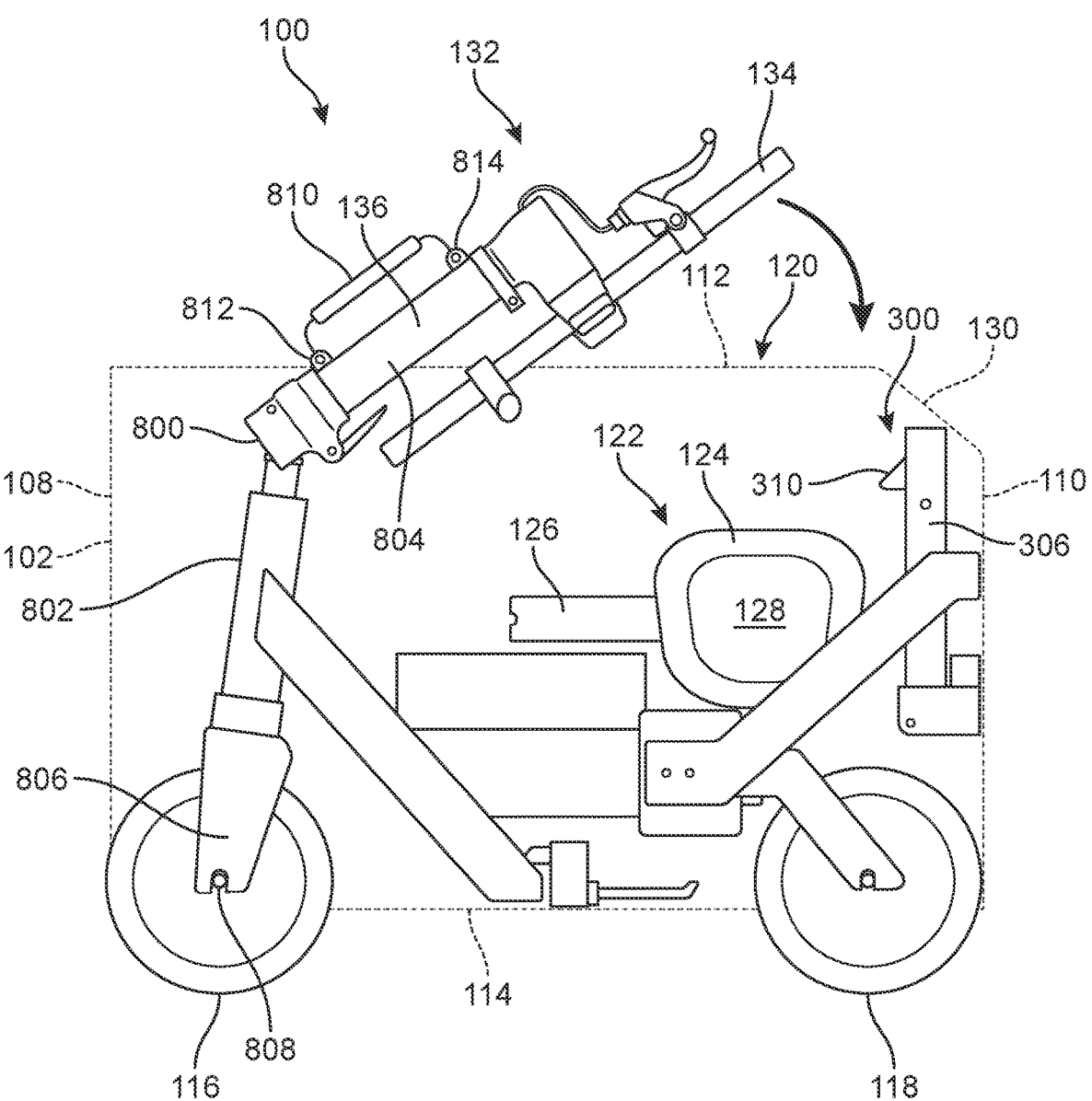
FIG. 8 is a representative side view of the example embodiment of the electric scooter in the process of folding the handlebar to the stowed configuration in accordance with aspects of the present disclosure.

Referring now to FIG. 8, in some embodiments, seat post release and handlebar holding mechanism 300 may be configured to securely hold handlebar 134 of steering assembly 132 in the folded position when electric scooter 100 is in the stowed configuration. As shown in FIG. 8, steering assembly 132 is configured to fold down into opening 120 along top edge 112 of electric scooter 100. In an example embodiment, steering assembly 132 includes a rotatable collar that may be rotated to move handlebar 134 from a horizontal orientation in the riding configuration orientation (e.g., perpendicular to steering shaft 136) to a vertical orientation in the stowed configuration (e.g., parallel to steering shaft 136). Handlebar 134 includes a pair of grips configured to allow a user to grab and hold onto handlebar 134 to steer electric scooter 100. In this embodiment, handlebar 134 includes grips at the opposite ends.

In this embodiment, steering assembly 132 is shown with handlebar 134 in a vertical orientation (e.g., parallel to steering shaft 136) with one end of handlebar 134 facing upwards and the opposite end of handlebar 134 facing downwards. In one embodiment, steering assembly 132 includes steering shaft 136 having a lower portion 802 and an upper portion 804 connected by a shaft connection mechanism 800 that includes a hinge (or similar mechanism). Steering shaft 136 also includes a fork 806 that is attached to an axle 808 of front wheel 116 at one end and the opposite end of fork 806 is attached to lower portion 802 of steering shaft 136.

In the riding configuration, steering shaft 136 of steering assembly 132 is in an extended position extending above opening 120 and top edge 112 of outer casing 102 of electric scooter 100. As described above, in some embodiments, one or more portions of steering shaft 136 may be telescopic. For example, in this embodiment, upper portion 804 of steering shaft 136 is telescopic and includes two segments, including a first segment that has an outside diameter that is smaller than an inside diameter of a second segment so that the first segment may slide or collapse into the second segment.

In some embodiments, a user may initiate the process of collapsing steering assembly 132 of electric scooter 100 from the riding configuration to the stowed configuration by collapsing or sliding the telescoping segments of upper portion 804 into each other to move steering shaft 136 from its initial extended position to a shorter, collapsed position. Next, once steering shaft 136 has been collapsed, steering assembly 132 may be folded into outer casing 102 of electric scooter 100 through opening 120 at top edge 112. As shown in FIG. 8, steering assembly 132 is shown in an intermediate position in the process of being folded into outer casing 102 of electric scooter 100 through opening 120 as electric scooter 100 is being transitioned to the stowed configuration.

In an example embodiment, shaft connection mechanism 800 may be unlocked to allow steering shaft 136 to fold into opening 120. Shaft connection mechanism 800 may include a hinge or similar mechanism that allows upper portion 804 of steering shaft 136 to fold from a generally vertical orientation outside of outer casing 102 (e.g., when electric scooter 100 is in the riding configuration) to a generally horizontal orientation inside of outer casing 102 (e.g., when electric scooter 100 is in the stowed configuration). In this embodiment, lower portion 802 of steering shaft 136 remains stationary. In an example embodiment, when steering shaft 136 is folded at shaft connection mechanism 800, upper portion 804 of steering shaft 136 and handlebar 134 in the vertical orientation are folded into outer casing 102 of electric scooter 100 through opening 120 at top edge 112. That is, steering assembly 132 is fully folded into outer casing 102 of electric scooter 100 in the stowed configuration.

In some embodiments, a carry handle 810 may be mounted on a portion of steering shaft 136 so that electric scooter 100 in the stowed configuration may be easily carried or moved by a user. In one embodiment, carry handle 810 has a generally C-shape with two opposite ends attached to upper portion 804 of steering shaft 136. As shown in FIG. 8, upper portion 804 of steering shaft 136 includes a first connection member 812 and a second connection member 814 that connect carry handle 810 to upper portion 804 of steering shaft 136. In some cases, carry handle 810 may be in the form of a strap that is attached to upper portion 804 of steering shaft 136 at first connection member 812 at one end and at second connection member 814 at the opposite end. In other embodiments, carry handle 810 may have other configurations or shapes. With this arrangement, carry handle 810 may be used to lift and/or carry electric scooter 100 when electric scooter 100 is in the stowed configuration.

Additionally, in some embodiments, seat assembly 122 may be placed or stowed inside an internal storage compartment when electric scooter 100 in the stowed configuration. For example, as shown in FIG. 8, seat assembly 122 is placed into an interior storage compartment of electric scooter 100 with the bottom end of seat post 126 facing towards front edge 108 of electric scooter 100 and seat 124 facing towards rear edge 110 of electric scooter 100. In other embodiments, the interior storage compartment of electric scooter 100 may have different arrangements to accommodate other orientations or placements of seat assembly 122 within the interior of electric scooter 100.

Referring now to FIG. 9, electric scooter 100 is shown in its fully stowed configuration. In this embodiment, steering assembly 132, including handlebar 134 in the vertical orientation, is folded inside of outer casing 102 of electric scooter 100 (e.g., within the interior storage compartment). When electric scooter 100 is collapsed from the riding configuration (as shown in FIG. 1) to the stowed configuration (as shown in FIG. 9), electric scooter 100 has a compact form factor that may be easily and conveniently carried by a user.

In an example embodiment, when electric scooter 100 is in the fully stowed configuration, as shown in FIG. 9, carry handle 810 projects or extends upwards and above opening 120 at top edge 112 of outer casing 102 of electric scooter 100. In some embodiments, seat post release and holding mechanism 300 of the example embodiments may further assist with securing steering assembly 132 and handlebar 134 in the folded position inside outer casing 102 of electric scooter 100 so that when a user lifts electric scooter 100 by carry handle 810, steering assembly 132 and handlebar 134 remain in the folded position inside outer casing 102 of electric scooter 100. That is, release and holding mechanism 300 in the locked configuration prevents or stops steering assembly 132 and handlebar 134 from being unfolded or removed from inside outer casing 102 of electric scooter 100.

In one embodiment, release and holding mechanism 300 includes latch 310 that extends outwards from frame post 306 and is engaged with a portion of handlebar 134 when handlebar is in the folded position to maintain an approximately horizontal orientation of handlebar 134 within outer casing 102 of electric scooter 100. By this arrangement, release and holding mechanism 300 acts to keep steering assembly 132 and handlebar 134 in the folded position inside outer casing 102 of electric scooter 100. Release and holding mechanism 300 allows a user to lift or carry electric scooter 100 using carry handle 810 attached to upper portion 804 of steering shaft 136 without unfolding steering assembly 132 and handlebar 134. With this arrangement, electric scooter 100 may be a convenient personal transport device for a user to travel for "last-mile" or "first-mile" trips to a destination in the riding configuration and can be quickly converted to the stowed configuration to allow the user to carry or transport once they reach their destination.

In some embodiments, electric scooter 100 may be transitioned back from the stowed configuration to the riding configuration by performing the various steps described herein in the reverse order to fully extend all of the components of electric scooter 100 outside of outer casing 102 so that electric scooter 100 may be ridden by a user.

Referring now to FIG. 10, a close up view of the engagement between latch 310 of release and holding mechanism 300 and a portion of handlebar 134 is shown. In an example embodiment, a grip 1000 disposed at one end of handlebar 134 includes an end cap 1002 having an indented recess 1004 facing towards latch 310 of release and holding mechanism 300. When handlebar 134 is folded down, front portion 312 of latch 310 is configured to fit into and mate with indented recess 1004 in end cap 1002 of grip 1000 at the end of handlebar 134.

As shown in FIG. 10, the shape of indented recess 1004 in end cap 1002 corresponds with the shape of front portion 312 of latch 310 of release and holding mechanism 300. In one embodiment, indented recess 1004 and front portion 312 of latch 310 have corresponding triangular shapes. Through this mechanical interlock between latch 310 and handlebar 134, handlebar 134 and upper portion 804 of steering shaft 136 are kept in the substantially horizontal orientation in the folded position inside outer casing 102 of electric scooter 100 so that when carry handle 810 attached to upper portion 804 of steering shaft 136 is used to lift and/or carry electric scooter 100, steering assembly 132 and handlebar 134 are restrained or prevented from unfolding.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

The invention claimed is:

1. A seat post release and handlebar holding mechanism for a personal transport device comprising:
   a frame post attached internally to the personal transport device;
   a seat post including an opening on one side, the seat post configured to fit onto the frame post;
   a latch connected inside of the frame post to a first pivot point, the latch extending outwards from one side of the frame post and extending through the opening in the seat post in a secured position;
   a lever member attached to the latch at a first end and having an engaging surface at an opposite second end, the engaging surface of the lever member extending out from the frame post on an opposite side from the latch;
   wherein the latch includes a front portion that extends through the opening in the seat post in the secured position and a pivot end that is connected to the first end of the lever member; and
   wherein the front portion of the latch is configured to engage with a portion of a handlebar of the personal transport device when the handlebar is folded inside the personal transport device.

2. The seat post release and handlebar holding mechanism according to claim 1, wherein the lever member is configured to rotate the latch at the first pivot point upon application of a downward force to the engaging surface to transition the latch from the secured position to a released position where the latch is withdrawn from the opening in the seat post.

3. The seat post release and handlebar holding mechanism according to claim 1, further comprising:
   a release button disposed behind the seat post;
   a plunger disposed beneath the release button;
   the plunger having a foot disposed at one end, the foot being located above the engaging surface of the lever member.

4. The seat post release and handlebar holding mechanism according to claim 3, wherein a downward force applied to the release button causes the foot of the plunger to contact the engaging surface of the lever member to rotate the latch inwards into the frame post to a released position where the latch is withdrawn from the opening in the seat post.

5. The seat post release and handlebar holding mechanism according to claim 1, wherein the lever member is attached inside the frame post at a second pivot point; and
   wherein the lever member further comprises a first portion that extends in a first direction from the second pivot point to the latch.

6. The seat post release and handlebar holding mechanism according to claim 1, wherein the lever member further comprises a second portion that extends from the second pivot point to the second end.

7. The seat post release and handlebar holding mechanism according to claim 1, wherein the front portion of the latch is configured to engage with an indented recess on an end cap of a grip of the handlebar.

8. A seat assembly for a personal transport device comprising:
   a seat having a seat surface;
   a seat post attached to an underside of the seat;
   the seat post including an opening on one side, the seat post configured to removably attach to a frame post of the personal transport device;
   a seat post release and handlebar holding mechanism comprising:
      a latch connected inside the frame post at a first pivot point; and a lever member attached to the latch at a first end and having an engaging surface at an opposite second end that extends outwards out from the frame post on an opposite side from the latch;

wherein the latch extends through the opening in the seat post when the seat post is attached to the frame post and the latch is in a secured position to mechanically lock the seat post to the frame post;

wherein the lever member is attached inside the frame post at a second pivot point; and the lever member further comprising a first portion that extends in a first direction from the second pivot point to the latch.

9. The seat assembly according to claim 8, wherein the lever member is configured to rotate the latch at the first pivot point upon application of a downward force to the engaging surface to transition the latch from the secured position to a released position where the latch is withdrawn from the opening in the seat post.

10. The seat assembly according to claim 8, further comprising:

a release button disposed behind the seat post;

a plunger disposed beneath the release button;

the plunger having a foot disposed at one end, the foot being located above the engaging surface of the lever member.

11. The seat assembly according to claim 10, wherein a downward force applied to the release button causes the foot of the plunger to contact the engaging surface of the lever member to rotate the latch inwards into the frame post to a released position where the latch is withdrawn from the opening in the seat post.

12. The seat assembly according to claim 8, wherein the latch includes a front portion that extends through the opening in the seat post in the secured position and a pivot end that is connected to the first end of the lever member.

13. The seat assembly according to claim 12, wherein the front portion of the latch is configured to engage with a portion of a handlebar of the personal transport device when the handlebar is folded inside the personal transport device.

14. The seat assembly according to claim 13, wherein wherein the front portion of the latch is configured to engage with an indented recess on an end cap of a grip of the handlebar.

15. The seat assembly according to claim 8, wherein the lever member further comprises a second portion that extends in a second direction from the second pivot point to the second end.

16. The seat assembly according to claim 15, wherein the first direction is a vertical direction and the second direction is a horizontal direction.

17. A compact personal transport device comprising:

an outer casing extending between a top edge and a bottom edge in a vertical direction and extending between a front edge and a rear edge in a horizontal direction;

an opening disposed along a top surface of the outer casing;

a frame post attached internally inside the outer casing, the frame post extending in the vertical direction;

a seat assembly configured to be removably mounted on the frame post of the compact personal transport device through the opening, the seat assembly comprising:

a seat having a seat surface;

a seat post attached to an underside of the seat;

the seat post including an opening on one side, the seat post configured to removably attach to the frame post of the compact personal transport device;

a seat post release and handlebar holding mechanism including a latch connected inside the frame post at a pivot point and a lever member attached to the latch at a first end and having an engaging surface at an opposite second end that extends outwards out from the frame post on an opposite side from the latch;

wherein the latch extends through the opening in the seat post when the seat post is attached to the frame post and the latch is in a secured position to mechanically lock the seat post to the frame post; and wherein the compact personal transport device further comprises:

a release button disposed within the opening of the outer casing behind the seat post; and a plunger disposed beneath the release button;

the plunger having a foot disposed at one end, the foot being located above the engaging surface of the lever member.

18. The compact personal transport device according to claim 17, wherein the latch includes a front portion that extends through the opening in the seat post in the secured position and a pivot end that is connected to the first end of the lever member; and wherein the front portion of the latch is configured to engage with a portion of a handlebar of the compact personal transport device when the handlebar is folded inside the compact personal transport device.

19. A compact personal transport device comprising:

an outer casing extending between a top edge and a bottom edge in a vertical direction and extending between a front edge and a rear edge in a horizontal direction;

an opening disposed along a top surface of the outer casing;

a frame post attached internally inside the outer casing, the frame post extending in the vertical direction;

a seat assembly configured to be removably mounted on the frame post of the compact personal transport device through the opening, the seat assembly comprising:

a seat having a seat surface;

a seat post attached to an underside of the seat;

the seat post including an opening on one side, the seat post configured to removably attach to the frame post of the compact personal transport device;

a seat post release and handlebar holding mechanism including a latch connected inside the frame post at a pivot point and a lever member attached to the latch at a first end and having an engaging surface at an opposite second end that extends outwards out from the frame post on an opposite side from the latch;

wherein the latch extends through the opening in the seat post when the seat post is attached to the frame post and the latch is in a secured position to mechanically lock the seat post to the frame post; and the compact personal transport device further comprising:

a foldable steering assembly configured to steer a front wheel of the compact personal transport device, the steering assembly comprising:

a steering shaft; and a handlebar secured to steering shaft;

wherein the latch includes a front portion that extends through the opening in the seat post in the secured position and wherein the front portion of the latch is configured to engage with a portion of a handlebar when the handlebar is folded inside the compact personal transport device.

20. The compact personal transport device according to claim 19, wherein the steering assembly further comprising a carry handle attached to the steering shaft; and wherein the carry handle extends above the opening along the top surface of the outer casing when the foldable steering assembly is folded inside the compact personal transport device.

\* \* \* \* \*